(12) United States Patent  (10) Patent No.: US 11,708,426 B2
Kasmark et al.  (45) Date of Patent: Jul. 25, 2023

(54) CONTINUOUS INVERSE EMULSION POLYMERIZATION PROCESS FOR UNIFORM POLYMER SIZE DISTRIBUTION

(71) Applicant: Championx USA Inc., Sugar Land, TX (US)

(72) Inventors: John M. Kasmark, Grandy, NC (US); Pious Kurian, Sugar Land, TX (US); Thomas Michael Weathers, Jr., Sugar Land, TX (US); David Israel Mendoza Serrano, Chicago, IL (US); Christopher L. Lancaster, Sugar Land, TX (US)

(73) Assignee: CHAMPIONX USA Inc., Sugar Land, TX (US)

( * ) Notice: Subject to any disclaimer, the term of this patent is extended or adjusted under 35 U.S.C. 154(b) by 204 days.

(21) Appl. No.: 17/203,465

(22) Filed: Mar. 16, 2021

(65) Prior Publication Data
US 2021/0292444 A1  Sep. 23, 2021

Related U.S. Application Data

(60) Provisional application No. 62/990,558, filed on Mar. 17, 2020.

(51) Int. Cl.
*C08F 2/32* (2006.01)
*C08F 2/24* (2006.01)
(Continued)

(52) U.S. Cl.
CPC ............. *C08F 2/32* (2013.01); *C08F 220/56* (2013.01); *C08F 2/24* (2013.01); *C08F 12/08* (2013.01); *C08F 18/08* (2013.01); *C08F 20/14* (2013.01)

(58) Field of Classification Search
None
See application file for complete search history.

(56) References Cited

U.S. PATENT DOCUMENTS 3,826,771 A  7/1974  Anderson et al.
3,867,331 A  2/1975  Mikofalvy et al.
(Continued)

FOREIGN PATENT DOCUMENTS

CN  201678615 U  12/2010
EP  0216091 B1  5/1992
(Continued)

OTHER PUBLICATIONS

Abbas, Shabbar et al. "An Overview of Ultrasound-Assisted Food-Grade Nanoemulsions," Food Engineering Reviews (Sep. 2013), 5(3), 139-157.
(Continued)

*Primary Examiner* — Richard A Huhn
(74) *Attorney, Agent, or Firm* — Eric D. Babych; Barnes & Thornburg LLP (57) ABSTRACT

A continuous inverse emulsion polymerization process may involve combining an aqueous monomer composition with an oil composition in a premix vessel and allowing the aqueous monomer composition to interact with the oil composition in the premix vessel for a period of time effective to form a stable pre-emulsion. The stable pre-emulsion may then be homogenized to form a homogenized emulsion that is then polymerized to form a water-in-oil inverse emulsion polymer. By forming a stable pre-emulsion that is then homogenized, the resulting water-in-oil inverse emulsion polymer may have uniform and consistent polymer size distribution.

19 Claims, 2 Drawing Sheets

(51) Int. Cl.
  *C08F 220/56*  (2006.01)
  *C08F 18/08*  (2006.01)
  *C08F 12/08*  (2006.01)
  *C08F 20/14*  (2006.01)

(56) References Cited

U.S. PATENT DOCUMENTS

| | | | |
|---|---|---|---|
| 4,037,040 | A | 7/1977 | Trapasso et al. |
| 4,115,340 | A | 9/1978 | Ellwanger |
| 4,379,883 | A | 4/1983 | Zecher |
| 4,664,528 | A | 5/1987 | Rodgers et al. |
| 4,727,110 | A | 2/1988 | Fan et al. |
| 5,380,465 | A | 1/1995 | Baker et al. |
| 5,470,150 | A | 11/1995 | Pardikes |
| 6,034,172 | A | 3/2000 | Muller et al. |
| 6,414,080 | B1 | 7/2002 | Loeffler et al. |
| 6,686,417 | B1 | 2/2004 | Reekmans et al. |
| 6,884,867 | B2 | 4/2005 | Pardikes |
| 7,776,958 | B2 | 8/2010 | Strominger et al. |
| 7,870,903 | B2 | 1/2011 | Fang et al. |
| 9,434,793 | B1 | 9/2016 | Kane et al. |
| 10,000,597 | B2 | 6/2018 | Cheucle |
| 2017/0198107 | A1 | 7/2017 | Pardikes |

FOREIGN PATENT DOCUMENTS

| | | | | |
|---|---|---|---|---|
| EP | 1694715 | B1 | 10/2007 | |
| GB | 2093464 | A | 9/1982 | |
| WO | 2001027165 | A1 | 4/2001 | |
| WO | 2017187150 | A1 | 11/2017 | |
| WO | 2019139596 | A1 | 7/2019 | |
| WO | WO-2019139596 | A1 * | 7/2019 | ............... C08F 2/32 |

OTHER PUBLICATIONS

Asua, Jose M. "Emulsion Polymerization: From Fundamental Mechanisms to Process Developments," Journal of Polymer Science Part A: Polymer Chemistry (2004), 42, 1025-1041.

Capek, I. et al. "On the Kinetics of Inverse Emulsion Polymerization of Acrylamide," Designed Monomers and Polymers 11 (2008), 123-137.

El-Hoshoudy, Abdelaziz Nasr Moawed Bakr. "Emulsion Polymerization Mechanism," Recent Research in Polymerization, Chapter 1. Intech (2018), 3-14. http://dx.doi.org/10.5772/intechopen.72143.

Rosdi, M.R.H. et al. "Optimizing homogenization parameters for improving ethylene vinyl acetate emulsion stability in pour point depressant application," Journal of King Saud University—Engineering Sciences (2018), 30, 105-115.

Silva, Helder D. et al. "Influence of surfactant and processing conditions in the stability of oil-in-water nanoemulsions" Journal of Food Engineering (Dec. 2015) 167(Part B), 89-98.

PCT International Search Report and Written Opinion for PCT/US2021/022612, dated Aug. 23, 2021, 13 pages.

* cited by examiner

CONTINUOUS INVERSE EMULSION POLYMERIZATION PROCESS FOR UNIFORM POLYMER SIZE DISTRIBUTION

CROSS-REFERENCE TO RELATED APPLICATIONS

This application claims the benefit of U.S. Provisional Patent Application Ser. No. 62/990,558, filed Mar. 17, 2020, the entirety of which is herein incorporated by reference.

TECHNICAL FIELD

This disclosure relates to inverse emulsion polymerization and, more particularly, to the formation of stable emulsions with decreased phase separation of oil from polymer.

BACKGROUND

Many polymerization processes and compositions are well known in many different fields. For example, inverse emulsions (water-in-oil emulsions) are commonly used to prepare high molecular weight water-soluble and water-swellable polymers. Inverse emulsion polymerization may be used in these cases because direct polymerization in the bulk water solution may lead to unacceptably high viscosities, undesired gelling, inefficient mixing, and other problems associated with very high molecular weight water soluble polymers. These problems may be avoided in the inverse emulsion medium because the high viscosity aqueous phase that results from the polymerization reaction is dispersed as droplets in a relatively low viscosity oil phase, maintaining fluidity of the bulk emulsion.

BRIEF SUMMARY

In general, this disclosure is directed to systems, devices, and techniques for performing continuous inverse emulsion polymerization. In some examples, the technique involves forming a stable pre-emulsion and controlling the particle size distribution of the pre-emulsion before polymerization. By controlling the formation of the pre-emulsion and the particle size distribution of the pre-emulsion, a more uniform and stable emulsion polymer may be formed following subsequent polymerization.

Without wishing to be bound by any particular theory, it is believed that direct mixing of an aqueous monomer composition and oil composition at or immediately before a polymerization reactor without forming a stable pre-emulsion and/or controlling the characteristics of the pre-emulsion may result in an inverse emulsion polymer exhibiting a high variation in gel numbers batch to batch and/or comparatively low emulsion stability. The pre-emulsion miscella formed upon mixing of the aqueous monomer composition and oil composition may exhibit a wide range and variation of particle sizes batch to batch and/or during continuous production of the inverse emulsion polymer. This can result in the inverse emulsion polymer exhibiting significant variation in gel number across different batches or runs and/or accelerated phase separation between the oil and water phases.

In some examples of the present disclosure, a technique for forming an inverse emulsion polymer involves combining one or more hydrophilic monomers in one or more oil compositions using a water-in-oil emulsifier in a premix tank to form a stable pre-emulsion. The stable pre-emulsion is then homogenized to form a homogenized emulsion having a substantially uniform miscella particle size. The homogenized emulsion is then polymerized using either an oil-soluble or water-soluble initiator to form a water in oil inverse emulsion polymer. The resulting inverse emulsion polymer may be characterized as viscous lattices comprised of submicroscopic, water-swollen, hydrophilic polymer particles colloidally suspended in the continuous oil phase.

To form a substantially stable pre-emulsion before homogenization, the production process may utilize one or more premix tanks that receive the hydrophilic monomers and oil composition. The premix tank, which may or may not be stirred, can provide a residence time for the monomer and oil to interact and form the stable pre-emulsion. The downstream homogenizer can receive the stable pre-emulsion and turn the pre-emulsion into emulsion droplets of substantially uniform size, which are then fed to a reactor for reaction and formation of the polymer.

Introducing the premix tank upstream of the homogenizer can provide more consistent and uniformly sized emulsion particles that are fed to the reactor for polymerization than if the hydrophilic monomer and oil phase are combined together and homogenized without being premixed. In a continuous inverse emulsion polymerization process, for example, incomplete emulsification of the hydrophilic monomer phase with the oil phase prior to homogenization may lead to further changes in the emulsion particle size downstream of the homogenizer prior to polymerization (e.g., as the monomer and oil continue to emulsify together). As a result, the effectiveness of the homogenizer to control the particle size of the emulsion prior to polymerization may be reduced.

By including a premix tank upstream of the homogenizer, according to some example implementations of the disclosure, a stable pre-emulsion can be formed prior to homogenization. When so implemented, the particle size distribution of the emulsion set by the homogenizer may be substantially stable and unchanging prior to polymerization. The resulting inverse emulsion polymer formed may be more uniform and stable than a comparable inverse emulsion polymer formed using pre-emulsions having inconsistent and/or variable particle size distributions.

In one example, a continuous inverse emulsion polymerization process is described that includes combining an aqueous monomer composition with an oil composition in a premix vessel and allowing the aqueous monomer composition to interact with the oil composition in the premix vessel for a period of time effective to form a stable pre-emulsion. The method further includes conveying the stable pre-emulsion from the premix vessel to a homogenizer and homogenizing the stable pre-emulsion to form a homogenized emulsion and polymerizing the homogenized emulsion in a reactor to form a water-in-oil inverse emulsion polymer.

In another example, a system is described that includes a source of an aqueous monomer composition, a source of an oil composition, a premix vessel, a homogenizer, and a reactor. The example specifies that the premix vessel is in fluid communication with the source of the aqueous monomer composition and the source of the oil composition. The premix vessel is configured to receive the aqueous monomer composition and receive the oil composition and allow the aqueous monomer composition to interact with the oil composition for a period of time effective to form a stable pre-emulsion. The homogenizer is in fluid communication with the premix vessel and is configured to receive the stable pre-emulsion from the premix vessel and homogenize the stable pre-emulsion to form a homogenized emulsion. The reactor is in fluid communication with the homogenizer and is configured to receive the homogenized emulsion from the homogenizer and react the homogenized emulsion to form a water-in-oil inverse emulsion polymer.

The details of one or more examples are set forth in the accompanying drawings and the description below. Other features, objects, and advantages will be apparent from the description and drawings, and from the claims.

DETAILED DESCRIPTION

This disclosure is generally directed to systems and processes for forming inverse emulsion polymers. In an inverse emulsion polymerization system, a water-soluble monomer can be dispersed in a continuous organic medium using a water-in-oil (e.g., hydrophobic) emulsifier. The nucleation, growth and stabilization of polymer particles may be controlled by a free radical polymerization mechanism in combination with various colloidal phenomena. The final product may be characterized as a dispersion of hydrophilic polymer particles in a continuous oil phase.

In accordance with examples of the present disclosure, a continuous inverse emulsion polymerization process may involve combining an aqueous monomer composition with an oil composition in a premix vessel and allowing the aqueous monomer composition to interact with the oil composition in the premix vessel for a period of time effective to form a stable pre-emulsion. The pre-emulsion may be stable in that the structure of the emulsion is well defined with droplets of the dispersed phase surrounded by a bulk continuous phase, e.g., with a surfactant sheathing the droplets. The formation of the droplets may be substantially or fully complete, with the emulsion resisting change in form and properties over time.

With the stable pre-emulsion formed, the pre-emulsion can be transferred from the premix vessel to a homogenizer to form a homogenized emulsion. The homogenizer can be configured with a rotor and stator arrangement that operates by pumping the pre-emulsion through a narrow gap between a perforated cylinder (the stator) with the blades of a rapidly rotating stirrer housed inside it (the rotor). This can produce a homogenized emulsion having a uniform emulsion particle size, e.g., exhibiting a small standard deviation. This homogenized emulsion can then be transferred to a reactor to form a water-in-oil inverse emulsion polymer exhibiting good uniformity and stability.

To form the inverse emulsion polymer, any polymerizable water-soluble ethylenically unsaturated monomer that is water-soluble and insoluble in a continuous oil phase can be used. This includes not only individual monomers but also combinations of two or more monomers which, when polymerized, produce water-soluble copolymers, terpolymers, etc. Example water-soluble monomers include acrylamide, methacrylamide, acrylic acid, alkali metal salts of acrylic acid, methacrylic acid, dimethylaminoethyl methacrylate, vinylbenzyl trimethylammonium chloride, alkali metal and ammonium salts of 2-sulfoethylacrylate, sodium styrene sulfonate, 2-aminoethylmethacrylate hydrochloride, alkali metal and ammonium salts of vinyl benzyl sulfonates and the like. The oil phase can be any inert hydrophobic liquid in which the water-soluble ethylenically unsaturated monomer is insoluble. To initiate reaction, a free radical polymerization initiator can be used, such as a peroxide catalyst. The particular composition of the water-in-oil inverse emulsion polymer formed will vary depending upon the particular materials, their respective weight percentages, and the conditions under which the materials are processed and polymerized.

Figure 1:
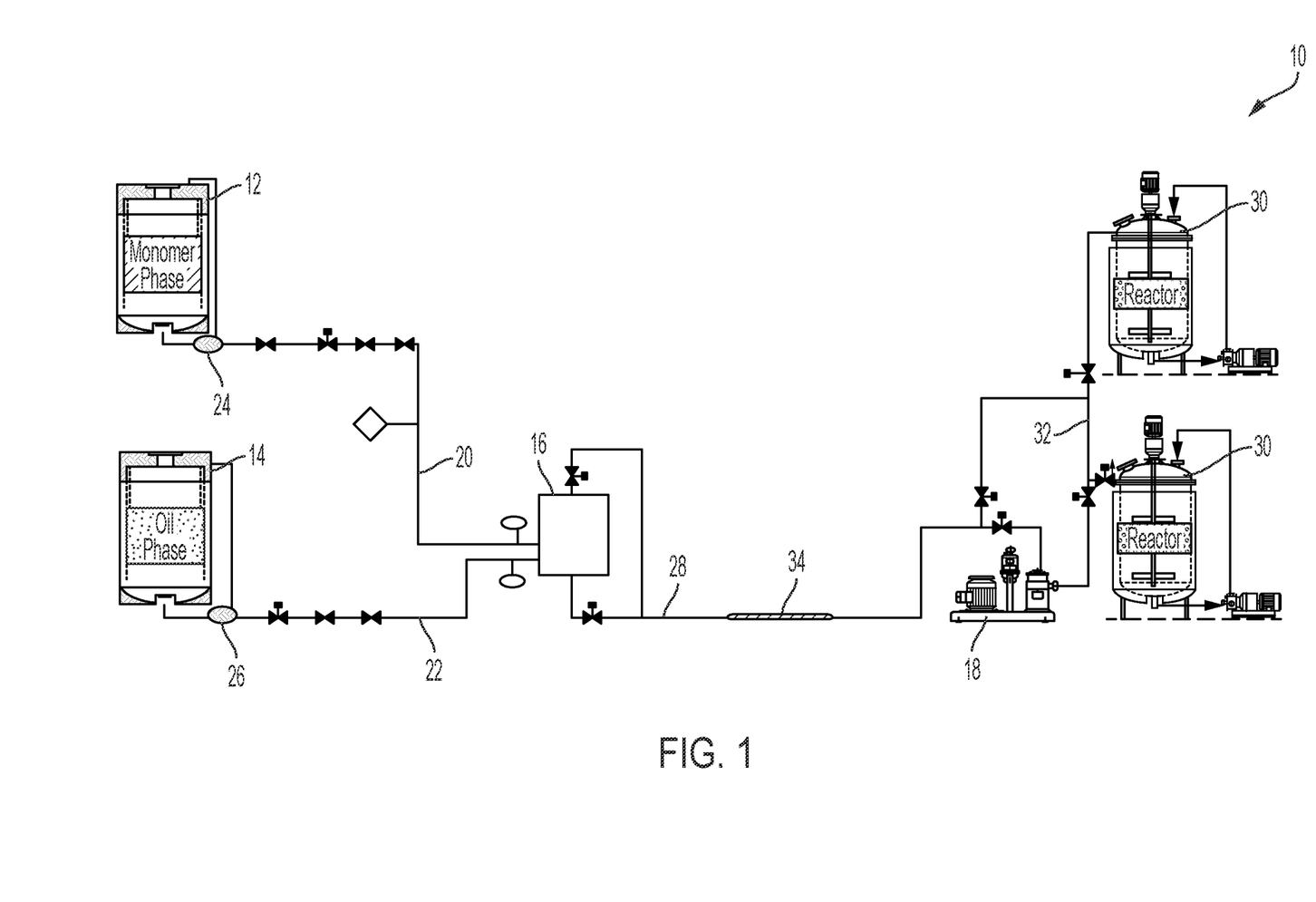
FIG. 1 is an illustration of an example system for forming an inverse emulsion polymer.

FIG. 1 is an illustration of an example system 10 for forming an inverse emulsion polymer. System 10 includes a source of an aqueous monomer composition 12, a source of an oil composition 14, a premix vessel 16, and a homogenizer 18. The source of the aqueous monomer composition 12, which is illustrated as a holding tank, is fluidly connected to premix vessel 16 via monomer piping 20. The source of the oil composition 14, which is also illustrated as a holding tank, is fluidly connected to premix vessel 16 via oil piping 22.

In operation, premix vessel 16 can receive the aqueous monomer composition pumped from source 12 via a monomer pump 24 and also receive the oil composition pumped from source 14 via oil pump 26. The oil and the monomer can mix within premix vessel 16 to form a pre-emulsion. The composition within the premix vessel may be referred to as a pre-emulsion since the combination is itself an emulsion but subject to further processing in system 10 before being polymerized within one or more reactors. Premix vessel 16 can help facilitate continuous production of polymer using system 10 by providing a residence time in which the monomer composition and oil composition can intermix together, forming a stable emulsion (also referred to as a pre-emulsion) upstream of homogenizer 18. As a result, the pre-emulsion received by homogenizer 18 may have fully formed and stable droplets of aqueous monomer composition within a continuous phase of the oil composition. The size distribution of the droplets may vary across a comparatively large size distribution, e.g., depending on the number of monomer molecules that aggregate together within each miscella droplet.

Premix vessel 16 is fluidly connected to homogenizer 18 via piping 28. Homogenizer 18 can receive the stable pre-emulsion form in premix vessel 16 and homogenize the pre-emulsion to form a homogenized emulsion. Homogenizer 18 can include one or more stages of rotors that rotate relative to stationary stators, which may be one or more stationary plates having slits or apertures sized based on a desired particle size (e.g., for the aqueous monomer droplets in the continuous oil phase) for the homogenized emulsion.

To form the inverse emulsion polymer, system 10 includes one or more reactors 30 which, in the illustrated example, is shown as two reactors 30. Reactor 30 can be in fluid communication with homogenizer 18 via piping 32, allowing the homogenized emulsion prepared by the homogenizer to be delivered to the reactor. Reactor 30 can be operated as a batch reactor, a continuous stirred tank reactor, a plug flow reactor, or yet other suitable reactor design. Homogenized emulsifier received from homogenizer 18 by reactor 30 can be polymerized using an initiator (e.g., chemical initiator), optionally under elevated or reduced temperature and/or pressure conditions relative to ambient pressure and temperature conditions. In some examples, reactor 30 is cooled for safety and/or to help prevent a runaway reaction for an otherwise exothermic process. Reactor 30 can produce an inverse emulsion polymer by polymerizing the aqueous phase of water-soluble monomers dispersed in droplet form in the hydrophobic phase, e.g., in the presence of at least one stabilizing surfactant, thereby providing a water-in-oil inverse emulsion polymer.

In different examples, the source of monomer 12 may be one or more fixed tanks, mobile tanker trucks, bottles, totes, or other type of reservoir capable of supplying one or more monomers to premix vessel 16. Any of water-soluble, polymerizable monomer or combinations of monomers may be used in an inverse emulsion polymerization process according to the disclosure, including anionic, cationic, and/or non-ionic monomers.

A cationic monomer is a monomer that possesses a net positive charge. Example cationic monomers include dialkylaminoalkyl acrylates and methacrylates and their quaternary or acid salts, including, but not limited to, dimethylaminoethyl acrylate methyl chloride quaternary salt, dimethylaminoethyl acrylate methyl sulfate quaternary salt, dimethyaminoethyl acrylate benzyl chloride quaternary salt, dimethylaminoethyl acrylate sulfuric acid salt, dimethylaminoethyl acrylate hydrochloric acid salt, dimethylaminoethyl methacrylate methyl chloride quaternary salt, dimethylaminoethyl methacrylate methyl sulfate quaternary salt, dimethylaminoethyl methacrylate benzyl chloride quaternary salt, dimethylaminoethyl methacrylate sulfuric acid salt, dimethylaminoethyl methacrylate hydrochloric acid salt, dialkylaminoalkylactylamides or methacrylamides and their quaternary or acid salts such as acrylamidopropyltrimethylammonium chloride, dimethylaminopropyl acrylamide methyl sulfate quaternary salt, dimethylaminopropyl acrylamide sulfuric acid salt, dimethylaminopropyl acrylamide hydrochloric acid salt, methacrylamidopropyltrimethylammonium chloride, dimethylaminopropyl, methacrylamide methyl sulfate quaternary salt, dimethylaminopropyl methacrylamide sulfuric acid salt, dimethylaminopropyl methacrylamide hydrochloric acid salt, diethylaminoethylacrylate, diethylaminoethylmethacrylate, diallyldiethylammonium chloride and diallyldimethyl ammonium chloride.

In some examples, the cationic monomers which may be used in the polymer production process may be chosen from monomers of the acrylamide, acrylic, vinyl, allyl or maleic type having a quaternary ammonium functional group. Cationic monomers include quaternary ammonium functionalities such as quaternized dimethylaminoethyl acrylate (ADAME), quaternized dimethylaminoethyl methacrylate (MADAME), acrylamidopropyltrimethylammonium chloride (APTAC), methacrylamidopropyltrimethylammonium chloride (MAPTAC), diallyldimethyl ammonium chloride (DADMAC), (meth)acrylamidopropyltrimethyl ammonium chloride ((M)APTAC), quaternary aminomethyl(meth)acrylamide (QAMAM), methacryloxyethyltrimethyl ammonium chloride (METAC), acryloxyethyltrimethyl ammonium chloride (AETAC), acrylamidoethylpropyl trimethyl ammonium chloride (AMPTAC), diethyldiallyl ammonium chloride (DEDAAC) and trimethylallyloxyethyl ammonium chloride (TAAC).

An anionic monomer is a monomer that possesses a negative charge above a certain pH range. Example anionic monomers include acrylic acid, and its salts, including, but not limited to sodium acrylate, and ammonium acrylate, methacrylic acid, and its salts, including, but not limited to sodium methacrylate, and ammonium methacrylate, 2-acrylamido-2-methylpropanesulfonic acid (AMPS), the sodium salt of AMPS, sodium vinyl sulfonate, styrene sulfonate, maleic acid, and its salts, including, but not limited to the sodium salt, and ammonium salt, sulfonate, itaconate, sulfopropyl acrylate or methacrylate or other water-soluble forms of these or other polymerisable carboxylic or sulfonic acids. Sulfomethylated acrylamide, allyl sulfonate, sodium vinyl sulfonate, itaconic acid, acrylamidomethylbutanoic acid, fumaric acid, vinylphosphonic acid, vinylsulfonic acid, allylphosphonic acid, sulfomethylated acrylamide, phosphonomethylated acrylamide, and the like.

A nonionic monomer is a monomer that is electrically neutral. Example nonionic monomers include acrylamide, methacrylamide, N-methylacrylamide, N,N-dimethyl(meth)acrylamide, N,N-diethyl(meth)acrylamide, N-isopropyl(meth)acrylamide, N-t-butyl(meth)acrylamide, N-(2)-hydroxypropyl)methacrylamide, N-methylolacrylamide, N-vinylformamide, N-vinylacetamide, N-vinyl-N-methylacetamide, poly(ethylene glycol)(meth)acrylate, poly(ethylene glycol) monomethyl ether mono(meth)acrylate, N-vinyl-2-pyrrolidone, glycerol mono((meth)acrylate), 2-hydroxyethyl(meth)acrylate, 2-hydroxypropyl(meth)acrylate, vinyl methylsulfone, vinyl acetate, glycidyl(meth)acrylate, and the like.

As with the source of monomer 12, the source of the oil composition 14 may be one or more fixed tanks, mobile tanker trucks, bottles, totes, or other type of reservoir capable of supplying one or more monomers to premix vessel 16. The oil composition may be or includes any inert hydrophobic liquid. Example inert hydrophobic liquids that may be used include, for example, aliphatic and aromatic hydrocarbons and halocarbons such as toluene, xylene, o-dichlorobenzene, perchloroethylene, hexane, heptane, and/or kerosene. The oil composition may be (or be produced from) a petroleum oil, a natural oil, a synthetically derived oil, a mineral oil, a silicone oil, and/or combinations thereof.

In some examples, the aqueous monomer composition is selected from the group consisting of vinyl esters, alkyl acrylates, alkyl methacrylates, vinyl ethers, acrylonitrile, styrene, N-vinyl carbazole, vinyl halides, and combinations thereof. In these examples, the oil composition may be selected from the group consisting of a petroleum oil, a natural oil, a synthetically derived oil, a mineral oil, a silicone oil, and combinations thereof.

To facilitate formation of the pre-emulsion, a water-in-oil emulsifying agent may be added to the aqueous monomer composition and/or the oil composition. The emulsifying agent may be included in the aqueous monomer composition (e.g., in tank 12), in the oil composition (e.g., in tank 26), and/or introduced from a separate reservoir containing the emulsifying agent. Typically, the emulsifying agent may be a surfactant (e.g., polymeric surfactant) present in the oil composition and supplied with the source of the oil composition 26.

Any water-in-oil emulsifying agent or combination of agents can be used. Example emulsifying agents that can be used include sodium dodecyl ether sulfate, chlorinated trimethyl stearyl ammonium, carboxymethyl cetyl ammonium, sucrose, sorbitan esters such as sorbitan monostearate, sucrose dilaurate, methyl cellulose ethers, hydroxypropyl methyl cellulose ethers, ethyl cellulose ethers, ethyl hydroxyethyl cellulose, methyl hydroxymethyl cellulose, starches, partially saponified polyvinyl acetates, saponified ethylene/vinyl acetate copolymers, poly(meth)acrylic acid alkaline metal salts, styrene and vinyl acetate copolymers, (meth)acrylate copolymers with (meth)acrylic acids or their salts, polyethylene imines, polyvinylic alcohols, polyalkyl (meth)acrylates, for which the alkyl group is a linear hydrocarbon chain with 12-18 carbon atoms, with the (meth) acrylic acids or their salts, and combinations thereof.

The relative amounts of aqueous monomer, oil composition, and emulsifying agent introduced into premix vessel 16 may vary depending on the specific component selected for the inverse emulsion polymer being formulated and the characteristics of the target polymer. In some examples, an amount of monomer is introduced that is effective to provide a monomer concentration ranging from 10 weight percent to 40 weight percent, such as from 20 weight percent to 35 weight percent, based on the weight of the emulsion (e.g., pre-emulsion) formed. These emulsifying agents may constitute from 0.5 weight percent to 10 weight percent, such as from one weight percent to five weight percent based on the weight of the emulsion. The oil phase may range from 10 weight percent to 90 weight percent, such as from 20 weight percent to 40 weight percent, or from 25% to 30% based on the weight of the emulsion.

A variety of additional optional agents can be added to the aqueous monomer composition, the oil composition, and/or the combination of streams within premix vessel 16. Example constituent components that may be added include, but are not limited to, chain transfer agents, buffers, reduced specific viscosity ("RSV") stabilizers, viscosity modifiers, salts (e.g., sodium chloride granules or brine), chelating agents, pH adjusters (e.g., acid or base), and combinations thereof.

Within system 10, premix vessel 16 receives the aqueous monomer composition and the oil composition (e.g., along with the emulsifying agent and any other optional compositional additives). The monomer composition and the oil composition can combine and intermix within the premix vessel to form a stable emulsion (referred to as a pre-emulsion for purposes of the broader discussion of system 10). Premix vessel 16 may be implemented as a tank, an enlarged section of piping, and/or yet other flow space within system 10 in which the monomer composition and oil composition are allowed to interact with each other for a period of time to form the stable pre-emulsion prior to being delivered to homogenizer 18.

Accordingly, premix vessel 16 may be sized based on the flow rate of monomer delivered by pump 24 and the flow rate of oil composition delivered by pump 26 to provide a residence time within the vessel for the oil and aqueous phases to interact and mix. The residence time for the formation and stabilization of the pre-emulsion within premix vessel 16 may vary depending on the operating conditions and constituent components being mixed.

In general, premix vessel 16 may be sized to provide a residence time for the monomer composition and the oil composition to intermix within the vessel is effective to form a stable pre-emulsion. As used herein, the phrase "stable pre-emulsion" refers to an emulsion that stays intact for at least 3 hours without significant visible phase separation and without measurable electrical conductivity. For example, at least 95 volume percent of the emulsion formed may remain emulsified for at least 3 hours (e.g., at least 5 hours, at least 8 hours, at least 24 hours) after formation without separating into distinct phases, such as 98 volume percent, or at least 99 volume percent.

In some examples, premix vessel 16 is sized effective to provide a residence time of at least five seconds for the monomer composition and the oil composition to interact within the vessel before being dispensed as the pre-emulsion from the vessel, such as at least 10 seconds, at least 30 seconds, or at least one minute. In some configurations, the residence time ranges from two seconds to one minute, such as from five seconds to 30 seconds.

Premix vessel 16 can be operated at ambient pressure, positive pressure, or negative pressure. In some applications, premix vessel 16 is operated at a positive pressure relative to ambient pressure, such as a pressure of at least five psig, a pressure of at least 10 psig, or a pressure of at least 15 psig. Operating premix vessel 16 at a positive pressure may help the aqueous monomer and oil composition coalesce into a stable pre-emulsion for subsequent processing.

To facilitate intermixing of the aqueous monomer composition in the oil composition, premix vessel 16 may or may not be agitated. For example, premix vessel 16 may be implemented as a stirred tank with one or more agitators. Alternatively, premix vessel 16 may be implemented as a plug-flow vessel having a back pressure but that does not have an internal mixer. In other words, the aqueous monomer and the oil composition may interact and mix within premix vessel 16 without agitating the aqueous monomer composition and the oil composition in the premix vessel using a driven agitator. In either implementation, premix vessel 16 may include a nozzle projecting into an interior vessel to help inject the aqueous monomer composition and/or the oil composition into the vessel to facilitate turbulent intermixing in the formation of the stable emulsion.

Figure 2:
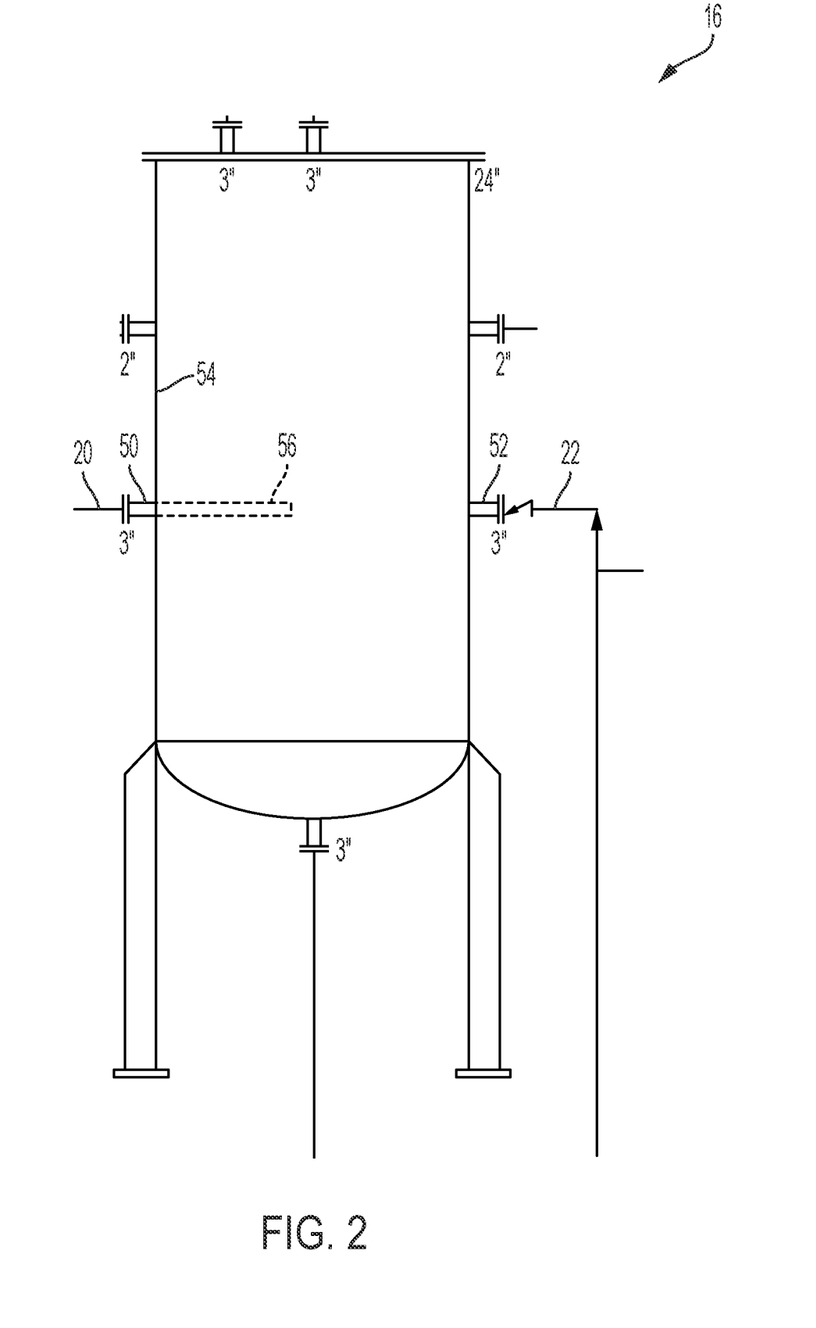
FIG. 2 is a side view of an example configuration of a premix vessel that can be used in the example inverse emulsion polymerization system of FIG. 1.

FIG. 2 is a side view of an example configuration of premix vessel 16 that can be used in the example inverse emulsion polymerization system 10 of FIG. 1. In the example of FIG. 2, premix vessel 16 is illustrated as a tank having a monomer inlet 50 connected to monomer pump 24 (FIG. 1) via piping 20. Premix vessel 16 also includes an oil inlet 52 connected to oil pump 26 (FIG. 1) via piping 22. Monomer inlet 50 and oil inlet 52 can define openings in a wall surface 54 (e.g., sidewall) of premix vessel 16 through with the monomer and the oil can enter the vessel, respectively.

In some configurations, one or both of monomer inlet 50 and oil inlet 52 defines a nozzle projecting into an interior of the vessel. For example, in FIG. 2, monomer inlet 50 is illustrated as defining a nozzle 56 projecting into an interior of the vessel. When configured with one or more nozzles, each nozzle may or may not taper from its inlet end toward its outlet end, e.g., to pressurize the fluid injected through the nozzle. Configuring premix vessel 16 with one or more nozzles can be useful to help inject and intermix the aqueous monomer and the oil composition within premix vessel 16.

With further reference to FIG. 1, the pre-emulsion formed in premix vessel 16 is supplied to homogenizer 18 via piping 28. In some configurations, a static mixer 34 is positioned in line between premix vessel 16 and homogenizer 18 to mix the pre-emulsion as it flows from the premix vessel to the homogenizer. In other configurations, system 10 may not include static mixer 34.

Homogenizer 18 reduces the average size of the dispersion droplets (aqueous phase monomer) within the continuous oil phase and/or generates a tighter size distribution for the dispersion droplets within the oil phase. Homogenizer 18 can force the pre-emulsion through a narrow gap at high pressure (e.g., homogenizing nozzle, stator) to produce a homogenized emulsion having substantially uniform dispersion droplets within the continuous oil phase. The size of these emulsion particles in the distribution or size range of particles may vary, e.g., based on the mechanical configuration of the homogenizer and the size of the slit(s) through which the pre-emulsion is forced at high shear.

In some applications, homogenizer 18 is configured to homogenize the stable pre-emulsion to provide a homogenized emulsion having a mean emulsion particle size ranging from 0.1 microns to 15 microns, such as from 0.2 microns to 10 microns, from 0.5 microns to 5 microns, or from 1 micron to 3 microns. The distribution (range) of emulsion particle sizes in the homogenized emulsion produced by homogenizer 18 may be sufficiently small that the particle size distribution exhibits one standard deviation value from the mean of less 5 microns, such as less than 2 microns, less than 1 micron, less than 0.5 microns, or less than 0.1 microns.

In different implementations, homogenizer 18 may be a single stage homogenizer or a multi-stage homogenizer that passes the fluid undergoing homogenization through multiple sequential stages. Homogenizer 18 may typically be implemented using a rotor-stator homogenizer, although any configuration of homogenizer that performs the functions described herein for homogenizer 18 can be used.

The homogenized emulsion with substantially uniform particle sized produced by homogenizer 18 is conveyed via piping 32 to reactor 30. Within reactor 30 the homogenized emulsion is polymerized to form a water-in-oil inverse emulsion polymer. Reactor 30 may be a batch reactor, a continuous stirred tank reactor, a plug flow reactor, or other suitable reaction vessel. Reactor 30 may include one or more impellers to vigorously agitate the constituent components charged to the reactor during polymerization.

To initiate polymerization, an initiator can be introduced into the homogenized emulsion (e.g., in reactor 30), such as a free radical initiator. The initiator may dissolve in either the oil phase or the aqueous phase, depending upon its solubility characteristics. Examples of water-soluble initiators include 4,4'-azobis-4-cyanovaleric acid (ACVA), and t-butyl hydroperoxide. Examples of oil-soluble initiators include azobisisobutyronitrile (AIBN), 2,2'-azobis(2,4-dimethylvaleronitrile) (ADVN), and benzoyl peroxide. In addition, water-soluble redox-type initiators can be used such as, for example bromate/bisulfite or metabisulfite (e.g., $KBrO_3/NaHSO_3$ or $KBrO_3/Na_2S_2O_5$), persulfate/bisulfite (e.g., $K_2S_2O_8/NaHSO_3$), and bisulfite/t-butyl hydroperoxide (e.g., $NaHSO_3$/t-butyl hydroperoxide).

The amount of chemical initiator utilized can depend upon several factors. Generally, the rate of reaction may be proportional to the reaction temperature for thermal initiators, e.g., as the reaction temperature is decreased the rate of reaction slows due to a decrease in the activity of the initiator. By adjusting the reaction temperature and initiator level, the polymerization can be accomplished in a reasonable time and at reasonable percent conversion of monomer to polymer (e.g., at least about 95%, such as at least 98%). Thus, while the concentration of the initiator may vary, in some examples the initiator may be used in amounts from about 0.1 to about 10,000 parts per million (ppm) based on the weight of the monomers, such as from about 0.1 to about 1,000 ppm or from about 1.0 to about 10,000 ppm.

Within reactor 30, water-in-oil inverse emulsion polymerization causes polymerization of the aqueous phase of water-soluble monomers emulsified in droplet form in the hydrophobic phase. The size of the polymer particles is related to the size of the droplets formed in the homogenized emulsion. Monomers within each aqueous phase droplet are polymerized together. The polymer may be retained in liquid form or one or more water and/or solvent extraction steps may be performed to isolate the polymer in bead form (dried solid form).

In system 10, features described as piping can be fluid conduits, such as pipes or segments of tubing that allow fluid to be conveyed from one location to another location in the system. The material used to fabricate the conduits should be chemically compatible with the liquid to be conveyed and, in various examples, may be steel, stainless steel, or a polymer (e.g., polypropylene, polyethylene). Features described as pumps may be any suitable fluid pressurization device such as a direct lift pump, positive displacement pump, velocity pump, buoyancy pump and/or gravity pump or any combination thereof.

System 10 and associated techniques may be performed as a continuous inverse emulsion polymerization process, a semi-continuous inverse emulsion polymerization process, or a batch inverse emulsion polymerization process. In continuous production the materials that are being processed may be characterized as being continuously in motion, with unit operations (e.g., premix vessel 16, homogenizer 18, reactor 30) continuously receiving incoming flow and discharging outgoing flow. In semi-continuous production, some of the unit operations (e.g., premix vessel 16, homogenizer 18) continuously receiving incoming flow and discharging outgoing flow while one or more other unit operations (e.g., reactor 30) is filled, operated for a period of time without receiving an incoming flow of material, and then discharged. In batch operation, each unit operation may be filled, operated for a period of time without receiving an incoming flow of material, and then discharged. A system utilizing premix vessel 16 may be particularly useful for continuous or semi-continuous production where the monomer composition and the oil composition may not otherwise interact for a sufficient period of time to form a stable pre-emulsion before preforming additional processing.

The following example may provide additional details about systems and techniques in accordance with this disclosure.

Example

An example inverse emulsion polymerization process was performed using two different embodiments consistent with the example system illustrated and described with respect to FIG. 1. The first embodiment utilized a system arrangement consistent with FIG. 1 that did not include premix vessel 16. The second embodiment utilized a system arrangement consistent with FIG. 1 that included premix vessel 16.

Monomer Phase Make Up:

The monomer phase make-up began by blending 18.8% by weight of acrylamide, 37.5% w/w of water and in most cases, a co-monomer of 7.8% w/w of acrylic acid. Acrylic acid is followed by the exothermic neutralization with 8.4% w/w of sodium hydroxide or ammonia. Temperature control was provided for safety (to prevent pre-polymerization and/or "runaway reactions") and product quality. The pH was adjusted to formula range, normally pH of 7. Tight pH control was provided for safety (to prevent pre-polymerization) and product quality. Any additional monomer phase additives (chain transfer agents, buffers, RSV stabilizers, viscosity modifiers, sodium chloride (granules or brine), etc.) were added depending on the formula. A final monomer phase ingredient of tetrasodium salt of ethylenediaminetetraacetic acid was added to chelate copper and other heavy metals.

Oil Phase Make Up:

The oil phase make-up was prepared by blending 23% w/w hydrocarbon solvent and 2% monooleate surfactants at an elevated temperature (per formula range), which dissolves the emulsifiers. Many of the emulsifiers are solid, waxy or viscous at room temperature. The temperature range was controlled so when it combined with the monomer phase (e.g. in premix vessel 16), the mixture is near the desired reaction temperature.

Emulsification:

Monomer and oil phase are fed together at the correct ratio. In the first embodiment omitting premix vessel 16, the monomer and oil phase were combined in the piping immediate before homogenizer 18 without premixing. In the second embodiment including premix vessel 16, the monomer and oil phase were combined in the premix tank.

In the second embodiment, the monomer phase fluid velocity was set high enough to ensure homogeneous mixing with the oil phase. This provided sufficient mixing and shear to establish a monomer-in-oil emulsion with the desired characteristics of viscosity and particle size distribution. Example flow rates for monomer phase can range from 8.5 to 10 ft/sec with oil phase fluid velocity between 3.5 to 5 ft/sec. Intermixing increased the fluid viscosity to between 200 and 600 cps. A back pressure between 15 to 25 psig was maintained to ensure enough residence time for complete homogenization of monomer and oil phase and a target particle size distribution which, in the example, ranged from approximately 1.2 to 2 microns before introduction to homogenizer.

Reaction:

Following homogenization, the reaction was started by adding initiators, either azo type, oil soluble initiators or water-soluble redox initiators. Since the polymerization is exothermic, temperature was be controlled by cooling. Temperature control to formula range was provided for safety (to prevent an uncontrollable reaction or runaway) and product quality. Conversion proceeds until nearly complete, with temperature increases possible as the reaction rate subsides. Small amounts of redox initiators may be added to hasten complete conversion at this point.

Results:

The inverse emulsion prepared by the first embodiment omitting premix tank 16 exhibited phase separation of the oil from the polymer after 3 weeks. By contrast, for the inverse emulsion prepared by the second embodiment including premix vessel 16, no phase separation of oil from polymer was noticeable after six months.

The invention claimed is:

1. A continuous or semi-continuous inverse emulsion polymerization process, comprising:
    combining an aqueous monomer composition with an oil composition in a premix vessel and allowing the aqueous monomer composition to interact with the oil composition in the premix vessel for a period of time effective to form a stable pre-emulsion;
    conveying the stable pre-emulsion from the premix vessel to a homogenizer and homogenizing the stable pre-emulsion to form a homogenized emulsion; and
    polymerizing the homogenized emulsion in a reactor to form a water-in-oil inverse emulsion polymer,
    wherein homogenizing the stable pre-emulsion comprises homogenizing the stable pre-emulsion to provide the homogenized emulsion with a mean emulsion particle size ranging from about 0.1 to 5 microns and an emulsion particle size standard deviation less than 1 micron.

2. The process of claim 1, wherein the mean emulsion particle size ranges from about 0.1 to 2 microns and the emulsion particle size standard deviation less than 0.5 microns.

3. The process of claim 1, wherein the period of time ranges from about 5 seconds to 30 seconds.

4. The process of claim 1, wherein the premix vessel has a monomer inlet through which the aqueous monomer composition is introduced into the premix vessel and an oil inlet through which the oil composition is introduced into the premix vessel, and at least one of the monomer inlet and the oil inlet defines a nozzle.

5. The process of claim 1, wherein combining the aqueous monomer composition with the oil composition in the premix vessel comprises:
    pressurizing the aqueous monomer composition and injecting the aqueous monomer composition under pressure into the premix vessel, and
    pressurizing the oil composition and injecting the oil composition under pressure into the premix vessel,
    wherein allowing the aqueous monomer composition to interact with the oil composition in the premix vessel comprises causing the aqueous monomer composition injected under pressure into the premix vessel to intermix with the oil composition injected under pressure into the premix vessel without agitating the aqueous monomer composition and the oil composition in the premix vessel using a driven agitator.

6. The process of claim 1, wherein the homogenizer is a multi-stage homogenizer.

7. The process of claim 1, wherein conveying the stable pre-emulsion from the premix vessel to the homogenizer comprises passing the stable pre-emulsion through a static mixer.

8. The process of claim 1, wherein the reactor is a continuous stirred tank reactor.

9. The process of claim 1, wherein the oil composition is selected from the group consisting of a petroleum oil, a natural oil, a synthetically derived oil, a mineral oil, a silicone oil, and combinations thereof.

10. The process of claim 1, wherein the aqueous monomer composition includes a monomer selected from the group consisting of vinyl esters, alkyl acrylates, alkyl methacrylates, vinyl ethers, acrylonitrile, styrene, N-vinyl carbazole, vinyl halides, and combinations thereof.

11. The process of claim 1, wherein at least one of the aqueous monomer composition and oil composition comprises a polymeric surfactant.

12. A system comprising:
    a source of an aqueous monomer composition;
    a source of an oil composition;
    a premix vessel in fluid communication with the source of the aqueous monomer composition and the source of the oil composition, the premix vessel being configured to receive the aqueous monomer composition and receive the oil composition and allow the aqueous monomer composition to interact with the oil composition for a period of time effective to form a stable pre-emulsion;
    a homogenizer in fluid communication with the premix vessel, the homogenizer being configured to receive the stable pre-emulsion from the premix vessel and homogenize the stable pre-emulsion to form a homogenized emulsion; and
    a reactor in fluid communication with the homogenizer, the reactor being configured to receive the homogenized emulsion from the homogenizer and react the homogenized emulsion to form a water-in-oil inverse emulsion polymer,
    wherein the homogenizer is configured to homogenize the stable pre-emulsion to provide the homogenized emulsion with a mean emulsion particle size ranging from 0.1 to 5 microns and an emulsion particle size standard deviation less than 1 micron.

13. The system of claim 12, wherein the period of time ranges from about 5 second to 30 seconds.

14. The system of claim 12, wherein the premix vessel has a monomer inlet through which the aqueous monomer composition is introduced into the premix vessel and an oil inlet through which the oil composition is introduced into the premix vessel, and at least one of the monomer inlet and the oil inlet defines a nozzle.

15. The system of claim 12, further comprising:
a monomer pump configured to pressurize the aqueous monomer composition from the aqueous monomer composition source and inject the aqueous monomer composition under pressure into the premix vessel, and
an oil pump configured to pressurize the oil composition from the oil composition source and inject the oil composition under pressure into the premix vessel,
wherein the premix vessel is configured to allow the aqueous monomer composition to interact with the oil composition by causing the aqueous monomer composition injected under pressure into the premix vessel to intermix with the oil composition injected under pressure into the premix vessel without agitating the aqueous monomer composition and the oil composition in the premix vessel using a driven agitator.

16. The system of claim 12, wherein the homogenizer is a multi-stage homogenizer.

17. The system of claim 12, further comprising a static mixer positioned between the premix vessel and the homogenizer, wherein the stable pre-emulsion passes through the static mixer flowing from the premix vessel to the homogenizer.

18. The system of claim 12, wherein:
the aqueous monomer composition is selected from the group consisting of vinyl esters, alkyl acrylates, alkyl methacrylates, vinyl ethers, acrylonitrile, styrene, N-vinyl carbazole, vinyl halides, and combinations thereof, and
the oil composition is selected from the group consisting of a petroleum oil, a natural oil, a synthetically derived oil, a mineral oil, a silicone oil, and combinations thereof.

19. A system comprising:
a source of an aqueous monomer composition;
a source of an oil composition;
a premix vessel in fluid communication with the source of the aqueous monomer composition and the source of the oil composition, the premix vessel being configured to receive the aqueous monomer composition and receive the oil composition and allow the aqueous monomer composition to interact with the oil composition for a period of time effective to form a stable pre-emulsion;
a homogenizer in fluid communication with the premix vessel, the homogenizer being configured to receive the stable pre-emulsion from the premix vessel and homogenize the stable pre-emulsion to form a homogenized emulsion; and
a reactor in fluid communication with the homogenizer, the reactor being configured to receive the homogenized emulsion from the homogenizer and react the homogenized emulsion to form a water-in-oil inverse emulsion polymer, wherein the reactor is a continuous stirred tank reactor.

\* \* \* \* \*